Patented Nov. 20, 1934

1,981,506

UNITED STATES PATENT OFFICE 1,981,506

FROTH PRODUCTION AND FROTH-PRODUCING REAGENT

Mahlin S. Hansen, Indianapolis, Ind., assignor to Peter C. Reilly, Indianapolis, Ind.

No Drawing. Application October 26, 1932, Serial No. 639,740

6 Claims. (Cl. 252—9)

This invention relates to the production of froth in and/or on a liquid, as in the froth-flotation process.

It is the object of this invention to provide a froth-producing agent which is in solid form at ordinary temperatures, is highly effective in producing froth, and in the preferred form is of simple monohydric phenolic character.

A number of industrial operations involve froth production, and so require froth-producing materials; that is, substances which when present in a liquid promote the production of a froth in and/or on the liquid when a gas is mixed with such liquid. One example of this is froth flotation; which has a wide use in the concentration and recovery of minerals, and is also applicable for separating animal and vegetable fibers, oil, grease, wax, and starch from various industrial liquids. Another example is in the aeration of liquids, as to increase the dispersion of a gas in a liquid (by making smaller the bubbles of gas formed) so that a greater surface of interface may be obtained for various purposes.

Heretofore the frother reagents used in industries have been liquids. These frother reagents have generally been relatively crude oil distillates, such as those obtained from pine-tree gum and from the destructive distillation of wood and coal; such for example as pine oil, wood creosote, and coal-tar acids. Other substances which are well-known and have been used as frothers are eucalyptus oil and ortho-toluidine. All of these have been liquids.

I have found that a good frothing action may be obtained with solids as the frothing reagents. Solid frothers have a number of advantages over liquid frothers. Among these advantages are the following:

1. Solid frothers can be transported more cheaply and easily, and with much greater safety, than can liquid frothers; particularly in case the transportation is by pack horse, as is often necessary.

2. Solid frothers can be more easily fed at a constant rate to flotation circuits, because of the absence of such disturbing factors as variable viscosity on change of temperature, etc.

3. Solid frothers can be handled by workmen with greater ease than can liquid frothers, and with less danger of serious burns when the frothers are inherently corrosive.

According to my present invention, the solid frothing reagent may take a number of forms. These are all intended to be covered by my generic claims here, and include certain simple monohydric phenolic derivatives in solid form which I am claiming specifically here and which I shall discuss more in detail.

The simple monohydric phenolic derivatives which I claim specifically in this present application are the xylenols which are in solid form at ordinary temperatures, whether as isolated chemical individuals or as such mixture which do not destroy the solid character of the substance at ordinary temperatures. This includes the mixture which may be obtained in the fractional distillation of coal tar acids by a "narrow cut" between temperatures of about 218° C. to 228° C.; which "narrow cut" of distillate is solid at ordinary temperatures and contains a mixture of xylenols, probably with some admixture of other phenols.

The specific xylenols which I prefer to use for the frothing reagents are the 1:3:5 and the 1:2:3 xylenols, and especially the former. In these xylenols, the hydroxyl group is in the 1-position, and the methyl groups are in the other two positions named; so that these two xylenols are specifically described as 1-hydroxy-3:5-dimethylbenzene, and 1-hydroxy-2:3-dimethylbenzene. These two preferred xylenols form a substance in which, with the hydroxy group in the 1-position, one methyl group is in the 3-position and the other methyl group is in a position midway between the 1-position and the 3-position on the benzene ring.

By ordinary temperatures, as here used, I mean temperatures up to 40° C.; and I intend to include frothers which are solid at a temperature of 40° C.

The solid frothers which are here included not only have the advantages above outlined, but have excellent frothing properties, approaching even the frothing power of the widely used terpineol, and being of the same order as that of the highly efficient oil of eucalyptus. The method of determining relative frothing properties which I use is accurate and simple, and as it has not been described in the literature so far as I am aware I now give it. It is as follows:

I place a measured quantity of a water solution of the froth-producing substance in a vertical glass tube of convenient length and diameter, provided at the lower end with a fritted silica filter through which a constant flow of air is passed into the tube and through the solution therein; and maintain the tube and its contents at a constant temperature. Then I determine the minimum concentration, in grams per liter of water, of the froth-producing agent which will give a two-bubble layer froth on the surface of the liquid. In this way I am able to determine frothing ability with substantial accuracy in terms of parts per million.

The smaller the amount of froth-producing agent necessary to give the two-bubble froth, the higher is the froth-producing activity of that agent.

Table I follows:

Table I

| Frother | Minimum quantity of frother in grams per liter of water at 25° C. to produce a two-bubble layer froth with constant air rate |
|---|---|
| Terpineol | 0.006 |
| Eucalyptus oil | 0.012 |
| Crude tar acids | 0.030 |
| Ortho-toluidine | 0.082 |
| Cresols: | |
| m-Cresol | 0.019 |
| p-Cresol | 0.022 |
| o-Cresol | 0.032 |
| Xylenols: | |
| 1-hydroxy-2:4-dimethylbenzene | 0.013 |
| 1-hydroxy-2:5-dimethylbenzene | 0.015 |
| 1-hydroxy-2:6-dimethylbenzene | 0.023 |
| 1-hydroxy-3:4-dimethylbenzene | 0.015 |
| 1-hydroxy-3:5-dimethylbenzene | 0.010 |
| 1-hydroxy-2:3-dimethylbenzene | 0.015 |

Of the six xylenols, the 1:2:4 xylenol (OH at 1) is not included in the present invention, because it is liquid at 40° C.; but the other five, when in substantially pure form, are all solid at 40° C. and are included in my claims of broader and intermediate breadth. Some of these xylenols have been mentioned in the literature as being contained in certain frothing reagents, but so far as I am aware they have not been mentioned as being in solid form at ordinary temperatures or as being used without the presence of such other materials that they are not in solid form at ordinary temperatures. So far as I am aware, the literature is wholly silent on the use at all of the 1:3:5 and the 1:2:3 xylenols (OH at 1); although of course these two and the other xylenols are included in the multitude of ingredients which make up crude tar acids.

I give below two examples showing the use of the preferred xylenols as froth-producing agents in the froth-flotation process.

Example I shows the use of these substances in comparison to crude tar acids on the flotation of pure mineral chalcocite in a neutral circuit.

Example II shows the use of these two xylenols in the flotation of a sulfide ore in a lime circuit having a hydrogen ion concentration of pH 9.1.

The following tests were run on pure mineral chalcocite in a 50-gram flotation cell described in my co-pending application Serial No. 636,310, filed October 5, 1932. 50 grams of minus 100 plus 800 mesh chalcocite, together with 50 cc. of water and 15 cc. of saturated lime water, were placed in the cell and agitated for one minute. The froth-producing agent, dissolved in water, and an amount of dibutyl-dithio-phosphoric acid as the selector reagent equivalent to 0.07 lb. per ton of mineral, were next added to the cell, and the whole agitated for one-half minute. At the end of this period, water was run in to raise the pulp level substantially to the lip of the flotation cell, and the froth which carries the floatable portion of mineral was taken off. The speed of the impeller was maintained at 2400 R. P. M. The weight of the material floated and so taken off is a measure of the activity of the frother.

In the following Table II, the amount of frother used, in amounts equivalent to pounds per ton of ore, and the respective mineral recoveries in per cent, are indicated:

Table II

| Frother substance in lbs. per ton of mineral | Percentage recovery of chalcocite |
|---|---|
| .02 lb. crude tar acid | No recovery |
| .04 lb. crude tar acid | No recovery |
| .06 lb. crude tar acid | 20.2 |
| .10 lb. crude tar acid | 70.0 |
| .12 lb. crude tar acid | 93.0 |
| .02 lb. 1-hydroxy-3:5-dimethylbenzene | 24.0 |
| .04 lb. 1-hydroxy-3:5-dimethylbenzene | 60.0 |
| .06 lb. 1-hydroxy-3:5-dimethylbenzene | 98.0 |
| .02 lb. 1-hydroxy-2:3-dimethylbenzene | 22.0 |
| .04 lb. 1-hydroxy-2:3-dimethylbenzene | 55.0 |
| .06 lb. 1-hydroxy-2:3-dimethylbenzene | 90.0 |

As will be seen from this Table II, either of the two xylenols tested is materially more efficient than is the crude tar acid, and gives substantially complete recovery with 0.06 lb. per ton of mineral, whereas with the same amount of crude tar acids the recovery is only about one-fifth as much.

*Example II.*—The following tests were run on a low-grade sulfide copper ore from the Utah Copper Company. The ore was dry-crushed to fine size, and then ground to 14% plus 100 mesh in a porcelain-ball mill in the presence of lime. Flotation tests were run in a standard 500-gram Janney flotation cell. Save for the variations indicated in Table III in the kind of frother reagent, the other conditions were kept constant. The speed of the impeller was maintained at 1500 R. P. M. Potassium cyanide as a pyrite depressant, diethyl-dithio-phosphoric acid as a selector reagent, and the frothing reagent being tested, were added in amounts equivalent to 0.12 lb., 0.04 lb., and 0.30 lb., respectively. The hydrogen ion concentration of the flotation circuit was pH 9.1. The following Table III shows the comparative results obtained:

Table III

| Frother | Assay of tailings | | Percent recovery | |
|---|---|---|---|---|
| | Percent Cu | Percent Fe | Percent Cu | Percent Fe |
| Crude tar acids | .085 | 1.40 | 91.3 | 44.0 |
| 1-hydroxy-3:5-dimethylbenzene | .065 | 1.25 | 93.4 | 50.0 |
| 1-hydroxy-2:3-dimethylbenzene | .060 | 1.30 | 93.9 | 48.0 |

In using my solid frothing reagents, solutions of them may be formed before adding them to the froth-flotation circuit. For better obtaining the advantages already outlined, however, I prefer to add them in powder form to the froth-flotation circuit, so that solutions of them are made directly therein.

The specific examples which I have given are illustrative only. Variations in the quantities of reagents employed, the combinations of reagents, the kind of material to be floated, the hydrogen ion concentration of the pulp, and the steps of the procedure, may be varied as required by the conditions of the flotation procedure.

Moreover, my solid froth-producing materials are not limited to use in the concentration and recovery of materials by froth flotation, but may be used in other processes requiring the production of froth either in or on a liquid. For instance, they may be used to produce a greater dispersion of gas through a liquid (by causing the bubbles to be smaller), as in passing a gas through a liquid in aeration processes; so that by reason of the increased interface surface the reactions due to the presence of the gas in the liquid may be facilitated. This usually requires smaller amounts of the froth-producing material than does the production of a layer of froth on the surface. An example of this is in producing dispersion of air bubbles in a solution of a ferrous-iron salt to convert the ferrous iron to feric iron.

The two preferred xylenols (the 1:3:5 and the 1:2:3 isomers) are broadly new with me as frothing reagents, so far as I am aware, and whether in a relatively pure form in which they are in the solid state at ordinary temperatures or in a cruder form in which they are liquid at such temperatures; and I aim to cover them broadly as froth-producing reagents. They may be used in neutral, alkaline, or acid circuits.

Methods of preparing the various xylenols are well-known, and are described in the literature. One convenient method of obtaining relatively pure 1-hydroxy-3:5-dimethyl-benzene is to obtain the fraction of crude tar acid which boils between 217.5° C. and 221° C., and chill it; by which crystals of this compound settle out first. These crystals are quite pure, but can be further purified by recrystallization, as from alcohol. The fraction obtained from the crude tar acid between 217.5° C. and 221° C. also contains 1-hydroxy-2:3-dimethylbenzene; which remains in the liquid after the 1:3:5 isomer has been crystallized out by chilling; and may be obtained in relatively pure form by fractionation, such as fractional distillation or fractional crystallization.

I claim as my invention:—

1. The process of producing froth in a liquid, which consists in mixing a gas with the liquid in the presence of a xylenol which is in the solid state at a temperature of 40° C.

2. The process of producing froth in a liquid, which consists in mixing a gas with the liquid in the presence of a froth-producing reagent which consists of the mixture obtained in the fractional distillation of coal tar acids by a narrow cut between the temperatures of 218° C. to 228° C. and which consists mainly of a mixture of xylenols.

3. The process of producing froth in a liquid, which consists in mixing a gas with the liquid in the presence of a xylenol which with the hydroxyl group in the 1-position has one methyl group in the 3-position and the other methyl group in a position midway between the 1-position and the 3-position on the benzene ring.

4. The process of producing froth in a liquid, which consists in mixing a gas with the liquid in the presence of 1-hydroxy-2:3-dimethylbenzene.

5. The process of producing froth in a liquid, which consists in mixing a gas with the liquid in the presence of 1-hydroxy-3:5-dimethylbenzene.

6. A froth-producing reagent, comprising a material of phenolic character, and which when added to a liquid promotes frothing on the mixing of a gas with such liquid, and which is the mixture obtained in the fractional distillation of coal tar acids by a narrow cut between the temperatures of 218° C. to 228° C. and which consists mainly of a mixture of xylenols.

MAHLIN S. HANSEN.